US007525916B2

(12) United States Patent  
Kikuma (10) Patent No.: US 7,525,916 B2  
(45) Date of Patent: Apr. 28, 2009

(54) HIGH-EFFICIENCY CONTROL OF RADIO BURST SIGNAL TRANSMISSION SYSTEM

(75) Inventor: Tomohiro Kikuma, Tokyo (JP)

(73) Assignee: NEC Corporation, Tokyo (JP)

( * ) Notice: Subject to any disclaimer, the term of this patent is extended or adjusted under 35 U.S.C. 154(b) by 672 days.

(21) Appl. No.: 11/167,595

(22) Filed: Jun. 28, 2005

(65) Prior Publication Data

US 2006/0002459 A1 Jan. 5, 2006

(30) Foreign Application Priority Data

Jun. 30, 2004 (JP) ............................. 2004-193743

(51) Int. Cl.  
*G01R 31/08* (2006.01)  
*G06F 11/00* (2006.01)  
*G08C 15/00* (2006.01)  
*H04J 1/16* (2006.01)  
*H04J 3/14* (2006.01)  
*H04L 1/00* (2006.01)  
*H04L 12/26* (2006.01)

(52) U.S. Cl. ................. 370/235; 370/252; 370/328; 370/468

(58) Field of Classification Search ................ 375/229, 375/259, 295; 370/352, 236.1; 714/704; 455/550.1  
See application file for complete search history.

(56) References Cited

U.S. PATENT DOCUMENTS 5,774,285 A * 6/1998 Kassab et al. ............... 360/31

6,046,983 A * 4/2000 Hasegawa et al. ........ 370/236.1  
7,062,687 B1 * 6/2006 Gfeller et al. ................ 714/704  
7,190,967 B2 * 3/2007 Kawai et al. .............. 455/550.1

FOREIGN PATENT DOCUMENTS

| JP | 2000-022661 | 1/2000 |
| JP | 2000-022749 | 1/2000 |
| JP | 2000-295313 | 10/2000 |
| JP | 2000-333262 | 11/2000 |
| JP | 2002-044135 | 2/2002 |

* cited by examiner

*Primary Examiner*—Ricky Ngo  
*Assistant Examiner*—David Oveissi  
(74) *Attorney, Agent, or Firm*—Dickstein Shapiro LLP (57) ABSTRACT

A radio burst signal transmission system operates to switch between a first control process for optimizing the number of bits added per symbol depending on the probability of successful reception of a successful reception indication signal and a second control process for divisionally sending a burst signal, depending on the state of a propagation path between a base station and a terminal. A fragmentation control request determining circuit in each of the base station and the terminal determines an average value and a variance value of time-depending variations of an error of a propagation path function, and a burst signal length of a reception burst signal, from the reception burst signal that is received from the terminal and the base station, and determines a pointer for requesting switching from the first control process to the second control process. When the terminal and the base station receive the request from the base station and the terminal, respectively, a fragmentation control circuit switches from the first control process to the second control process and sends a transmission burst signal to the base station and the terminal if the burst signal length of the reception burst signal exceeds a predetermined value.

8 Claims, 3 Drawing Sheets

HIGH-EFFICIENCY CONTROL OF RADIO BURST SIGNAL TRANSMISSION SYSTEM

BACKGROUND OF THE INVENTION

1. Field of the Invention

The present invention relates to a radio burst signal transmission system.

2. Description of the Related Art

Figure 1:
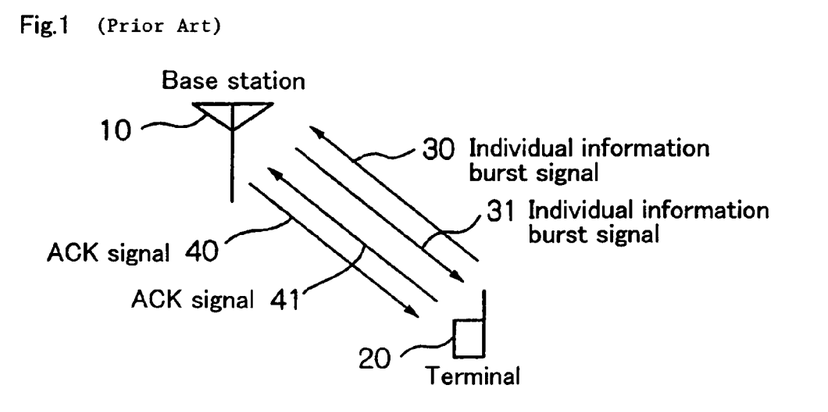
FIG. 1 is a diagram showing a general arrangement of a conventional radio burst signal transmission system.

FIG. 1 of the accompanying drawings shows a general arrangement of a radio burst signal transmission system. In FIG. 1, terminal 20 belongs to base station 10. For upstream communications, terminal 20 sends individual information burst signal 30 to base station 10. If base station 10 properly receives individual information burst signal 30, then base station sends ACK (Acknowledgment) signal 40 to terminal 20. If terminal 20 receives ACK signal 40, then terminal 20 sends new individual information burst signal 30 to base station 10, if necessary. If terminal 10 does not receive ACK signal 40, then terminal 20 resends individual information burst signal 30 to base station 10.

For downstream communications, a similar exchange of signals takes place between base station 10 and terminal 20. Specifically, base station 10 sends individual information burst signal 31 to terminal 20. If terminal 20 properly receives individual information burst signal 31, then terminal 20 sends ACK signal 41 to base station 10. If base station 10 receives ACK signal 41, then base station 10 sends new individual information burst signal 31 to terminal 20, if necessary. If base station 10 does not receive ACK signal 41, then base station 10 resends individual information burst signal 31 to terminal 20.

Figure 2:
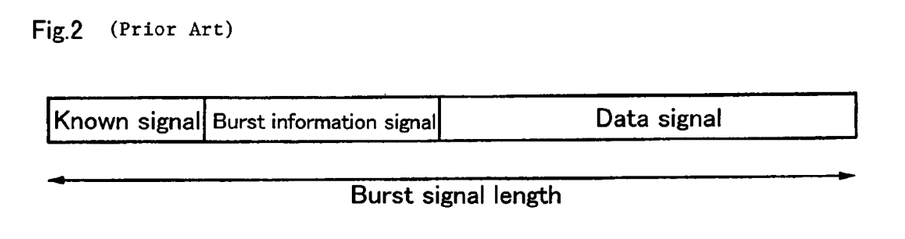
FIG. 2 is diagram showing an example of the format of a radio burst signal.

FIG. 2 of the accompanying drawings shows an example of the format of a radio burst signal used in the radio burst signal transmission system. The radio burst signal transmission system performs synchronization and propagation path estimation using a known signal added to the leading end of the burst signal shown in FIG. 2. The radio burst signal transmission system also determines information required to demodulate the burst signal, such as the length of the burst signal and the modulation scheme thereof, using a burst information signal of the bust signal. The radio burst signal transmission system demodulates the burst signal based on the synchronization and the propagation path estimation that have been performed and the information that has been determined.

A process of controlling the radio burst signal transmission system for high transmission efficiency will be described below. Generally, a radio propagation path between a transmitter and a receiver in the radio burst signal transmission system is represented by a function of a frequency component f in a frequency band that is used and a time dependent variation t of the frequency component f. That is, the radio propagation path is represented by a function $F(f,t)$. For demodulating a burst signal that has been propagated through the radio propagation path $F(f,t)$, the radio propagation path is estimated using a known signal added to the leading end of the burst signal. If the radio propagation path is estimated at a time $t=0$, then the radio propagation path estimated using the known signal is represented by $F(f,t=0)$. A data signal contained in the burst signal is demodulated using $F(f,t=0)$.

With the above demodulation process, since the radio propagation path $F(f,t)$ is expressed as the function of the time t, the difference $\Delta F(t)$ between $F(f,t)$ and $F(f,t=0)$ tends to increase with the time. This may be attributed to a phase shift due to a fluctuation of the oscillation frequency of the oscillator and a disturbance such as an amplitude/phase shift due to fading. The increase of the difference $\Delta F(t)$ also increases the amplitude and phase errors of the demodulated signal, making the probability of a burst demodulation error greater toward the trailing end of the burst signal.

Prior art solutions to the abovementioned problem include performing an adaptive transmission rate control process based on the probability of successful reception of a successful reception indication signal, referred to as ACK, indicating the successful reception of a radio packet signal. According to the adaptive transmission rate control process, the number of bits to be assigned per symbol is set to an optimum value depending on the probability of successful reception of ACK. Specifically, if the probability of successful reception of ACK is higher, then the number of bits to be assigned per symbol is increased to increase a transmission rate. On the other hand, if the probability of successful reception of ACK is lower, then the number of bits to be assigned per symbol is reduced in order to suppress a reduction in the transmission rate due to a packet signal error, thereby increasing the robustness against disturbances and reducing an error rate of the burst signal.

There are available different types of the adaptive transmission rate control process in the art. They include, for example, an adaptive modulation control process to select an optimum modulation signal from BPSK (Binary Phase Shift Keying), QPSK (Quadrature Phase Shift Keying), 16 QAM (Quadrature Amplitude Modulation), and 64 QAM signals depending on the quality of the received signal, and an adaptive encoding ratio control process to set an encoding ratio to an optimum value depending on the quality of the received signal.

With the adaptive transmission rate control process based on the probability of successful reception of ACK, if the probability of successful reception of ACK is higher, then the quality of the received signal is judged as high, and the number of bits to be assigned per symbol is increased or the encoding ratio is increased for communications thereby to increase the transmission efficiency. On the other hand, if the probability of successful reception of ACK is lower, then the quality of the received signal is judged as low, and the number of bits to be assigned per symbol is reduced or the encoding ratio is reduced for communications thereby to reduce the frequency of resending requests due to a burst signal error to increase the transmission efficiency.

The adaptive transmission rate control process is usually performed on a fixed number of data per burst signal. When the probability of successful reception of ACK is lowered and the transmission rate is reduced, the number of pits transmitted per unit time is reduced, resulting in an increase in the length of the burst signal.

In general, when the length of a burst signal increases, the burst signal reception rate tends to increase because the difference $\Delta F(t)$ increases by increase (a). If a reduction (b) in the burst signal reception rate due to an increase in the distance between minimum signal points resulting from a reduction in the transmission rate or an increase in the encoding ratio is greater than the increase (a), then the burst signal reception rate is reduced as a whole, increasing the transmission efficiency. Conversely, if the reduction (b) is smaller than the increase (a), then the transmission efficiency is reduced.

In order to improve the reduction in the transmission efficiency, it has heretofore been proposed to perform a fragmentation control process, which is a type of the adaptive transmission rate control process, for divisionally transmitting burst signals. For details, see JP-A-2002-44135, for example. According to the fragmentation control process, the length of each burst signal can be shortened for divisionally transmitting burst signals. As a result, an increase in the error $\Delta F(t)$ which tends to increase with time can be suppressed. As a consequence, the burst signal reception error rate is lowered, and the frequency of resending requests for a burst signal is lowered, thus increasing the transmission efficiency.

In summary, the conventional control processes for increasing the transmission efficiency include an adaptive transmission rate control process (hereinafter referred to as "first control process") and a fragmentation control process (hereinafter referred to as "second control process"). The first control process is more suitable for use as a control process as the error ΔF(t) becomes more time-uncorrelated. The second control process is more suitable for use as a control process as the error ΔF(t) becomes more time-correlated.

The conventional adaptive transmission rate control process depending on the probability of successful reception of ACK is performed solely based on information indicative of whether or not the received burst signal is in error. Therefore, the conventional adaptive transmission rate control process is problematic in that it is unable to determine with accuracy whether the optimum control process for improving the transmission efficiency is the first control process or the second control process. If the first control process is to be selected as an optimum control process, but the second control process is actually selected in error, then the burst signal reception error rate is not reduced by shortening the length of each burst signal, and the transmission efficiency is not increased. Conversely, if the second control process is to be selected as an optimum control process, but the first control process is actually selected in error, then the transmission rate is lowered to increase the length of each burst signal, so that the difference ΔF(t) increases with time, the burst signal reception error rate increases, and the transmission efficiency is not increased.

SUMMARY OF THE INVENTION

It is an object of the present invention to provide an adaptive transmission rate control process which is capable of determining with accuracy whether an optimum control process for improving a transmission efficiency is a first control process or a second control process.

To achieve the above object, in an adaptive transmission rate control process according to the present invention, a base station and a terminal which belongs to the base station determine an average value and a variance value of time dependent variations of an error of a propagation path function between the base station and the terminal, and a burst signal length of a reception burst signal, from the reception burst signal that is received from the terminal and the base station, and determines a pointer for requesting switching from a first control process for optimizing the number of bits added per symbol depending on the probability of successful reception of a successful reception indication signal to a second control process for divisionally sending a burst signal.

If the average value of the time dependent variations of the error of the propagation path function between the base station and the terminal is large, then since the time correlation of the error ΔF(t) is considered to be large, the second control process is preferable to the first control process. Conversely, if the variance value of the error of the propagation path function between the base station and the terminal is small, then since the time correlation of the error ΔF(t) is considered to be small, the first control process is preferable to the second control process. Because the pointer is determined from the above values and switching between the first and second control processes is requested based on the pointer, an appropriate one of the control processes can be selected.

The pointer is produced by dividing the product of the average value of the time dependent variations of the error of the propagation path function between the base station and the terminal and the burst signal length of the burst signal received, by the variance value of the time dependent variations of the error of the propagation path function between the base station and the terminal. If the pointer has a larger value, then the second control process is preferable to the first control process.

If the base station and the terminal detect a data error of the reception bust signal, and also detect that the pointer has become larger than a predetermined first value, then the base station and the terminal send a first request to switch from the first control process to the second control process to the terminal and the base station, respectively.

Conversely, if the base station and the terminal detect no data error of the reception bust signal, and also detect that the pointer has become smaller than a predetermined second value, then the base station and the terminal send a second request to switch from the second control process to the first control process to the terminal and the base station, respectively.

On the other hand, if the terminal and the base station receive the first request from the base station and the terminal, respectively, and also detect that the burst signal length of a transmission burst signal has become larger than a predetermined third value, then the terminal and the base station send a third request to switch from the first control process to the second control process to the base station and the terminal, respectively.

By thus not only receiving the first request, but also checking whether the burst signal length of the transmission burst signal to be actually sent is large enough to perform the second control process, it is possible to perform more appropriate switching between the first and second control processes.

If the terminal and the base station receive the second request from the base station and the terminal, respectively, then the terminal and the base station switch from the second control process to the first control process and send the transmission burst signal to the base station and the terminal, respectively.

As described above, the present invention is capable of solving the problem of a failure to determine accurately whether the optimum control process for improving the transmission efficiency is the first control process or the second control process, in the conventional adaptive transmission rate control process, and of increasing the transmission efficiency of a radio burst signal transmission system.

The above and other objects, features, and advantages of the present invention will become apparent from the following description with reference to the accompanying drawings which illustrate an example of the present invention.

DETAILED DESCRIPTION OF THE PREFERRED EMBODIMENT

Figure 3:
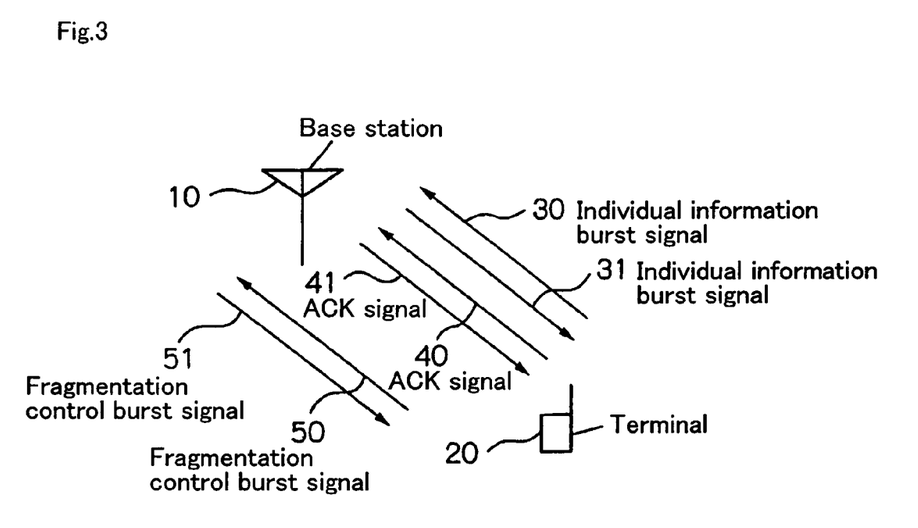
FIG. 3 is a diagram showing a general arrangement of a radio burst signal transmission system according to an embodiment of the present invention.

Referring to FIG. 3, there is shown a general arrangement of a radio burst signal transmission system according to an embodiment of the present invention. In FIG. 3, terminal 20 belongs to base station 10.

For upstream communications, terminal 20 sends individual information burst signal 30 to base station 10. If base station 10 properly receives individual information burst signal 30, then base station 10 sends ACK signal 41 to terminal 20. If terminal 10 receives ACK signal 41, then terminal 20 sends new individual information burst signal 30 to base station 10, if necessary. On the other hand, if terminal 20 does not receive ACK signal 41, then terminal 20 resends individual information burst signal 30 to base station 10. Depending on the received state of the burst signal, base station 10 sends a fragmentation control signal as fragmentation control burst signal 51 to terminal 20. The fragmentation control signal may be included in ACK signal 41. When terminal 20 receives the fragmentation control signal, terminal 20 sends individual information burst signal 30 which is fragmentation-controlled to base station 10.

For downstream communications, a similar exchange of signals takes place between base station 10 and terminal 20. Specifically, base station 10 sends individual information burst signal 31 to terminal 20. If terminal 20 properly receives individual information burst signal 31, then terminal 20 sends ACK signal 40 to base station 10. If base station 10 receives ACK signal 40, then base station 10 sends new individual information burst signal 31 to terminal 20, if necessary. If base station 10 does not receive ACK signal 40, then base station 10 resends individual information burst signal 31 to terminal 20. Depending on the received state of the burst signal, terminal 20 sends a fragmentation control signal as fragmentation control burst signal 50 to base station 10. The fragmentation control signal may be included in ACK signal 40. When base station 10 receives the fragmentation control signal, base station 10 sends individual information burst signal 31 which is fragmentation-controlled to terminal 20.

Figure 4:
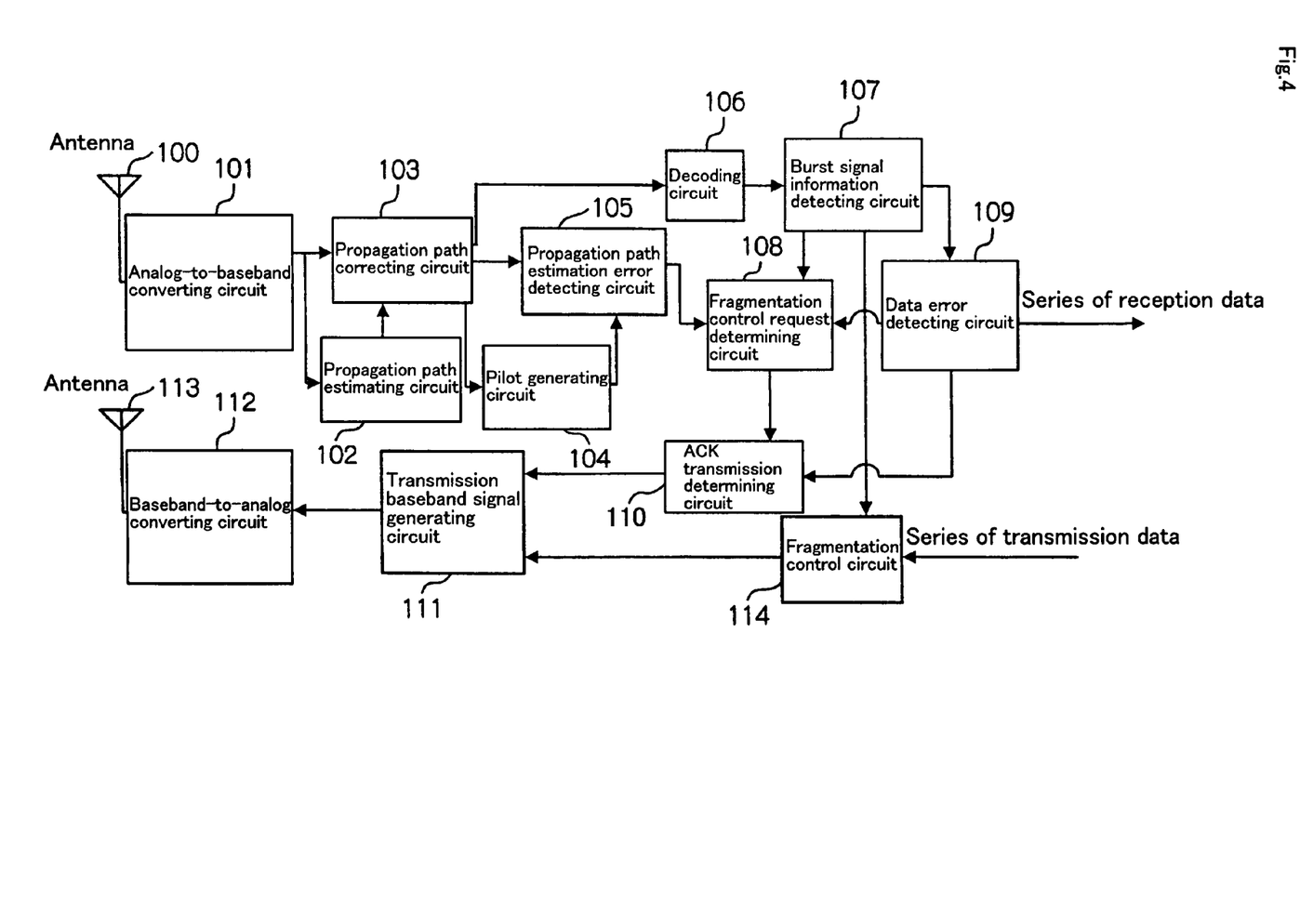
FIG. 4 is a block diagram showing an arrangement of a transmitter-receiver of a terminal or a base station in the radio burst signal transmission system shown in FIG. 3.

FIG. 4 shows an arrangement of a transmitter-receiver of base station 10 or terminal 20. In FIG. 4, a burst signal that has been propagated as a radio signal is received by antenna 100. The received burst signal is then converted from an analog signal into a reception baseband signal by analog-to-baseband converting circuit 101. The reception baseband signal is represented by R(f,t) where R(f,t) indicates a function of frequency f and time t. Propagation path estimating circuit 102 estimates propagation path function F(f,t=0) from a known signal included in the received burst signal that is output from analog-to-baseband converting circuit 101. Propagation path correcting circuit 103 performs a propagation path correcting process on reception baseband signal R(f,t), using propagation path function F(f,t=0). Specifically, propagation path correcting circuit 103 divides reception baseband signal R(f,t) by propagation path function F(f,t=0) estimated by propagation path estimating circuit 102, thus calculating transmission baseband signal S(f,t). Pilot generating circuit 104 extracts a pilot signal added to the burst signal or generates a pilot signal.

Propagation path estimation error detecting circuit 105 calculates a propagation path estimation error from the output signal of pilot generating circuit 104, i.e., the pilot signal, and the output signal of propagation path correcting circuit 103, i.e., transmission baseband signal S(f,t), thereby detecting the propagation path estimation error. Specifically, propagation path estimation error detecting circuit 105 determines an error ΔF(t) based on the pilot signal and then calculates time dependent variation ΔF_error(t) of the error ΔF(t) with respect to amplitude/phase according to the following equation:

$$\Delta F\_error(t) = \Delta F(t) - \Delta F(t - \Delta t) \quad (1)$$

where Δt(>0) represents any optional time interval.

Decoding circuit 106 decodes data that have been error-corrected. Burst signal information detecting circuit 107 decodes a burst signal length, modulation process information (BPSK, QPSK, 16 QAM, 64 QAM, etc.), and encoding ratio information from the burst information signal added to the burst signal shown in FIG. 2, and detects information with regard to the burst signal.

Data error detecting circuit 109 detects an error of the data of the burst signal. Fragmentation control request determining circuit 108 determines whether a fragmentation control process is to be started or stopped based on the propagation path estimation error calculated by propagation path estimation error detecting circuit 105, the data error information from data error detecting circuit 109, and the information with regard to the burst signal from burst signal information detecting circuit 107, and outputs a decision signal.

ACK transmission determining circuit 110 judges that ACK data are to be sent if it has received information indicating that there is no data error of the burst signal from data error detecting circuit 109, and instructs transmission baseband signal generating circuit 111 to send ACK data. Transmission baseband signal generating circuit 111 generates a baseband signal of a burst signal in response to ACK data output from ACK transmission determining circuit 110 or data from a transmission data sequence that is output from fragmentation control circuit 114. The baseband signal generated by transmission baseband signal generating circuit 111 is converted by baseband-to-analog converting circuit 112 into an analog signal, which is sent from antenna 113 to base station 10 or terminal 20. Fragmentation control determining circuit 108 outputs a determined result about the fragmentation control process to ACK transmission determining circuit 110.

For the sake of simplicity, functional blocks for performing the adaptive transmission rate control process based on the probability of successful reception of ACK are omitted from illustration in FIG. 4 because those functional blocks are of conventional nature.

A process performed by base station 10 to send and receive signals when an ACK signal including the information from fragmentation control determining circuit 108 is set to base station 10 will be described below.

In base station 10, the fragmentation control information included in the ACK signal received from terminal 20 is detected by burst signal information detecting circuit 107. The fragmentation control information detected by burst signal information detecting circuit 107 is sent to fragmentation control circuit 114. Based on the fragmentation control information, fragmentation control circuit 114 starts or stops the fragmentation control process, and outputs a signal representative of the start or stop of the fragmentation control process to transmission baseband signal generating circuit 111. The transmission baseband signal from transmission baseband signal generating circuit 111 is sent through baseband-to-analog converting circuit 112 and antenna 113 to terminal 20. Downstream communications from base station 10 to terminal 20 have been described above. A similar process is performed for upstream communications from terminal 20 to base station 10.

The embodiment of the present invention has a first feature residing in fragmentation control request determining circuit 108. Operation of fragmentation control request determining circuit 108 will be described in detail below.

Fragmentation control request determining circuit 108 receives time dependent variation $\Delta F\_error(t)$ according to the above equation (1) that is output at a predetermined time interval from propagation path estimation error detecting circuit 105, and calculates, as a sum quantity thereof, average value Ave_$\Delta F\_error$ and variance value Var_$\Delta F\_error$ of $\Delta F\_error$ that is measured per burst.

Fragmentation control request determining circuit 108 also receives burst signal error P_error from data error detecting circuit 109. If there is no burst signal error, then P_error=0, and if there is a burst signal error, then P_error=1. If P_error=0, then fragmentation control request determining circuit 108 calculates value M_Frag according to the following equation:

$$M\_Frag = Ave\_\Delta F\_error * Length / Var\_\Delta F\_error \quad (2)$$

where Length represents the burst signal length.

Value M_Frag according the equation (2) represents a pointer indicative of the degree of probability that the second control process, i.e., the fragmentation control process, is optimum rather than the first control process, as described below.

Figure 5:
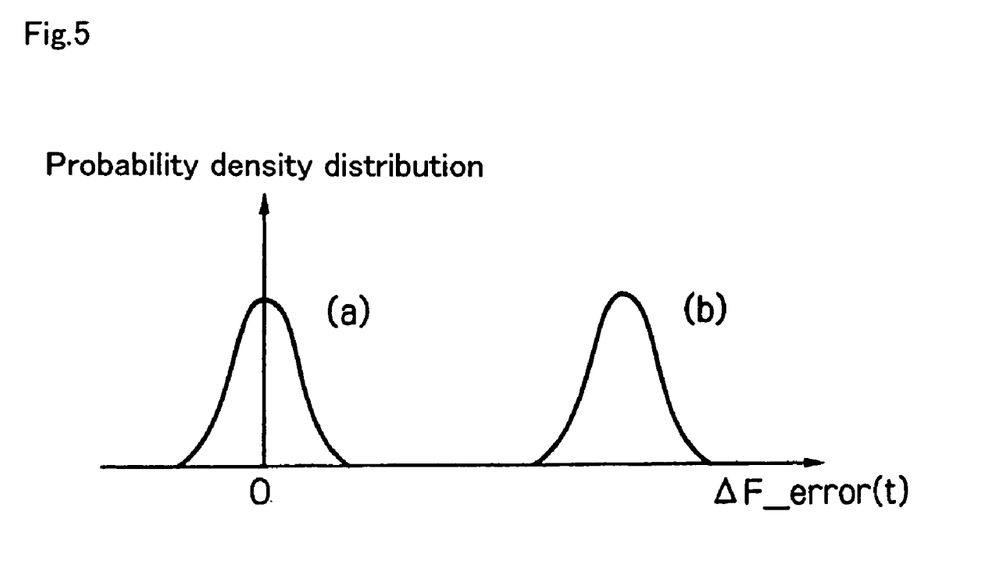
FIG. 5 is a diagram showing a probability density distribution of ΔF_error(t).

FIG. 5 statistically shows a probability density distribution of $\Delta F\_error(t)$. In FIG. 5, characteristic curve (a) represents a state wherein there is only a time-uncorrelated variation that is typified by thermal noise. On the other hand, a characteristic curve (b) represents a state wherein there are a time-uncorrelated variation that is typified by thermal noise and a time-correlated variation such as a transmitter fluctuation, fading, etc. in the radio propagation path. Since Ave_$\Delta F\_error$ in the equation (2) represents an average time-dependent variation of the time-correlated variation, as Ave_$\Delta F\_error$ increases, a more data error is likely to occur toward the trailing end of the burst signal, and the probability that the second control process, i.e., the fragmentation control process, is optimum rather than the first control process becomes higher. Stated otherwise, since characteristic curve (b) has greater Ave_$\Delta F\_error$ than characteristic curve (a) in FIG. 5, it is better suited for the second control process.

The greater Length indicative of the burst signal length in the equation (2), the greater will be the number of samples of $\Delta F\_error(t)$ and the accuracy of statistical data, and hence the reliability of value M_Frag goes higher. Therefore, the reliability of value M_Frag is increased by weighting Ave_$\Delta F\_error$ with Length.

As variance value Var_$\Delta F\_error$ of $\Delta F\_error(t)$ according to the equation (2) becomes greater, the accuracy with which to estimate the time-dependent variation of steady $\Delta F\_error$(t) is lowered, resulting in a greater proportion of the time-uncorrelated variation. Therefore, the probability that the first control process is optimum rather than the second control process, i.e., the fragmentation control process, becomes higher. The reliability of value M_Frag is thus increased by dividing Ave_$\Delta F\_error$ Length by Var_$\Delta F\_error$.

From the foregoing, it can be seen that value M_Frag according the equation (2) represents a pointer indicative of the degree of probability that the second control process, i.e., the fragmentation control process, is optimum rather than the first control process.

If P_error=1 because of a burst signal error, then the start of the fragmentation control process is requested if absolute value |M_Frag| of latest value M_Frag which is calculated according to the equation (2) is greater than decision threshold Th_ON as expressed by the following equation:

$$|M\_Frag| > Th\_ON \, (>0) \quad (3)$$

If |M_Frag| satisfies the equation (3), then the fragmentation control process becomes active. If P_error=0 because of no burst signal error, and the following equation is satisfied, then the stop of the fragmentation control process is requested:

$$|M\_Frag| < Th\_OFF \, (>0) \quad (4)$$

The decision threshold Th_OFF in the equation (4) and the decision threshold Th_ON in the equation (3) are set to satisfy the following relationship in order to prevent the control load from increasing for switching between the start and the stop of the fragmentation control process:

$$Th\_ON > Th\_OFF \, (>0) \quad (5)$$

Value M_Frag in the equation (2) may be calculated from the statistical quantity of a plurality of burst signals in the past. The degree of a burst signal error may be determined from the statistical quantity of P_error.

The embodiment of the present invention has a second feature residing in fragmentation control circuit 114. Operation of fragmentation control circuit 114 will be described in detail below.

When the receiver has received an ACK signal including the fragmentation control information, burst signal information detecting circuit 107 extracts the fragmentation control information from the ACK signal, and sends the fragmentation control information to fragmentation control circuit 114. As described above, fragmentation control circuit 114 performs the fragmentation control process on a data sequence to be sent based on the fragmentation control information. The fragmentation control process is finally determined based on the information of transmission burst signal L_Txdata at the time of transmission. Whether the fragmentation control process is to be performed or not is determined according to the following inequality:

$$L\_Txdata > Th\_Txdata \quad (6)$$

where Th_Txdata represents a decision threshold which is determined based on the fragment information extracted by fragmentation control circuit 114.

If transmission burst signal L_Txdata at the time of transmission satisfies the inequality (6), then the fragmentation control circuit 114 redivides the transmission burst signal according to the fragmentation control process, and instructs transmission baseband signal generating circuit 111 to send the redivided transmission burst signal. If transmission burst signal L_Txdata at the time of transmission does not satisfy the inequality (6), then fragmentation control circuit 114 does not perform the fragmentation control process, and instructs transmission baseband signal generating circuit 111 to send the transmission burst signal. If fragmentation control circuit 114 receives a fragmentation control process stop request from the fragmentation control signal extracted by burst signal information detecting circuit 107, then fragmentation control circuit 114 stops performing the fragmentation control process.

Decision threshold Th_Txdata in the inequality (6) may adaptively be controlled depending on the frequency with which fragmentation control process request signals are received. Specifically, if the frequency with which fragmentation control process request signals are received is high, then decision threshold Th_Txdata is lowered to increase the frequency of the fragmentation control process for thereby reducing the error ratio of the transmission burst signal to reduce the frequency with which to resend the transmission burst signal, thus increasing the transmission efficiency. If the frequency with which fragmentation control process request signals are received is low, then decision threshold Th_Txdata is increased to lower the frequency of the fragmentation control process for thereby improving the transmission efficiency based on the fragmentation control process.

Decision threshold Th_Txdata in the inequality (6) may also adaptively be controlled depending on the modulation scheme and encoding ratio for the transmission burst signal. Specifically, if the number of bits added per symbol is large based on the information as to the modulation scheme and encoding ratio for the transmission burst signal, then since the communication robustness against a time dependent variation of the radio propagation path is low, decision threshold Th_Txdata may be lowered to increase the frequency of the fragmentation control process for thereby reducing the error ratio of the transmission burst signal to reduce the frequency with which to resend the transmission burst signal, thus increasing the transmission efficiency. On the other hand, if the number of bits added per symbol is small, then since the communication robustness against a time dependent variation of the radio propagation path is high, decision threshold Th_Txdata may be increased to lower the frequency of the fragmentation control process for thereby improving the transmission efficiency based on the fragmentation control process.

In the fragmentation control circuit 114, the transmitter which has received the fragmentation request signal finally determines the fragmentation control process. As described above, the effectiveness of the fragmentation control process depends on the length of the transmission burst signal at the time of transmission. Specifically, the smaller the length of the transmission burst signal, the less susceptible will be the transmission burst signal to a time dependent variation of the propagation path, and hence the probability for selecting the fragmentation control process is lowered. Conversely, the greater the length of the transmission burst signal, the more susceptible will be the transmission burst signal to a time dependent variation of the propagation path, and hence the probability for selecting the fragmentation control process is increased. By finally determining the fragmentation control process based on the information of decision threshold Th_Txdata in the inequality (6), the adequacy of the selection of the fragmentation control process is increased for increasing the transmission efficiency.

Each of the circuits in the base station and the terminal according to the present invention may be implemented by a dedicated piece of hardware. Alternatively, it may be implemented by recording a program for performing the function thereof in a computer-readable recording medium, and having a computer which serves as the base station or the terminal read and run the recorded program. The computer-readable recording medium may be a recording medium such as a flexible disk, a magneto-optical disk, a CD-ROM, or the like, or a storage device such as a hard disk drive or the like incorporated in a computer system. The computer-readable recording medium may also be a medium for holding a program for a certain period of time, such as a medium for dynamically holding a program, e.g.,volatile memory in the computer system.

While a preferred embodiment of the present invention has been described using specific terms, such description is for illustrative purposes only, and it is to be understood that changes and variations may be made without departing from the spirit or scope of the following claims.

What is claimed is:

1. An adaptive transmission rate control process for being performed by a base station or a terminal belonging to the base station in a radio burst signal transmission system, said process comprising the steps of:

determining, in a first station, from a reception burst signal received from a second station, an average value and a variance value of time dependent variations of an error of a propagation path function between said first station and said second station, and a burst signal length of said reception burst signal, and determining a pointer to request switching from a first control process for optimizing the number of bits added per symbol depending on the probability of successful reception of a successful reception indication signal to a second control process for divisionally sending a transmission burst signal, based on the average value, the variance value, and the burst signal length which are thus determined;

if said first station detects an data error of said reception burst signal and detects that said pointer has become larger than a predetermined first value, sending a first request to switch from said first control process to said second control process, from said first station to said second station;

if said first station detects no data error of said reception burst signal and detects that said pointer has become smaller than a predetermined second value, sending a second request to switch from said second control process,from said first station to said second station;

if said second station receives said first request from said first station and also detects that the burst signal length of the transmission burst signal has become larger than a predetermined third value, switching from said first control process to said second control process and sending said transmission burst signal from said second station to said first station; and if said second station receives said second request from said first station, switching from said second control process to said first control process and sending said transmission burst signal from said second station to said first station.

2. The adaptive transmission rate control process according to claim 1, wherein said pointer is produced by dividing the product of the average value of the time dependent variations of the error of the propagation path function between said first station and said second station and the burst signal length of said reception burst signal, by the variance value of the time dependent variations of the error of the propagation path function between said first station and said second station.

3. The adaptive transmission rate control process according to claim 1, wherein said predetermined second value is smaller than said predetermined first value.

4. The adaptive transmission rate control process according to claim 1, wherein said predetermined third value is changed depending on the frequency with which said first request is received.

5. A computer program recorded on a computer readable recording medium that when loaded and run by a computer, causes the computer to execute each of the steps according to claim 1, further comprising a computer serving as the base station, which is either said first station or said second station, or the terminal belonging to said base station.

6. A base station to which a plurality of terminals belong in a radio burst signal transmission system, said base station comprising:
- means for determining, from a reception burst signal received from one of said terminals, an average value and a variance value of time dependent variations of an error of a propagation path function between said base station and said terminal, and a burst signal length of said reception burst signal, and determining a pointer to request switching from a first control process for optimizing the number of bits added per symbol depending on the probability of successful reception of a successful reception indication signal to a second control processor for divisionally sending a transmission burst signal, based on the average value, the variance value, and the burst signal length which are thus determined;
- means for, if said base station detects an data error of said reception burst signal and detects that said pointer has become larger than a predetermined first value, sending a first request to switch from said first control process to said second control process, to said terminal;
- means for, if said base station detects no data error of said reception burst signal and detects when said pointer becomes smaller than a predetermined second value, sending a second request for switching from said second control process to said first control process, to said terminal;
- means for, if said base station receives a request corresponding to said first request made by said terminal from said terminal and also detects that the burst signal length of a transmission burst signal has become larger than a predetermined third value, switching from said first control process to said second control process and sending said transmission burst signal to said terminal; and
- means for, if said base station receives a request corresponding to said second request made by said terminal from said terminal, switching from said second control process to said first control process and sending said transmission burst signal to said terminal.

7. A terminal belonging to a base station in a radio burst signal transmission system, said terminal comprising:
- means for determining, from a reception burst signal received from said base station, an average value and a variance value of time dependent variations of an error of a propagation path function between said base station and said terminal, and a burst signal length of said reception burst signal, and determining a pointer to request switch from a first control process for optimizing the number of bits added per symbol depending on the probability of successful reception of a successful reception indication signal to a second control process for divisionally sending a transmission burst signal, based on the average value, the variance value, and the burst signal length which are thus determined;
- means for, if said terminal detects an data error of said reception burst signal and detects that said pointer has become larger than a predetermined first value, sending a first request to switch from said first control process to said second control process, to said base station;
- means for, if said terminal detects no data error of said reception burst signal and detects that said pointer has become smaller than a predetermined second value, sending a second request to switch from said second control process to said first control process, to said base station;
- means for, if said terminal receives a request corresponding to said first request made by said base station from said base station and also detects that the burst signal length of a transmission burst signal has become larger than a predetermined third value, switching from said first control process to said second control process and sending said transmission burst signal to said base station; and
- means for, if said terminal receives a request corresponding to said second request made by said base station from said base station, switching from said second control process to said first control process and sending said transmission burst signal to said base station.

8. A radio burst signal transmission system comprising:
- means for determining, from a reception burst signal received from one of said terminals, an average value and a variance value of time dependent variations of an error of a propagation path function between said base station and said terminal, and a burst signal length of said reception burst signal, and determining a pointer to request switching from a first control process for optimizing the number of bits added per symbol depending on the probability of successful reception of a successful reception indication signal to a second control process for divisionally sending a transmission burst signal, based on the average value, the variance value, and the burst signal length which are thus determined;
- means for, if said base station detects an data error of said reception burst signal and detects that said pointer has become larger than a predetermined first value, sending a first request to switch from said first control process to said second control process, to said terminal;
- means for, if said base station detects no data error of said reception burst signal and detects when said pointer becomes smaller than a predetermined second value, sending a second request for switching from said second control process to said first control process, to said terminal;
- means for, if said base station receives a request corresponding to said first request made by said terminal from said terminal and also detects that the burst signal length of a transmission burst signal has become larger than a predetermined third value, switching from said first control process to said second control process and sending said transmission burst signal to said terminal;
- means for, if said base station receives a request corresponding to said second request made by said terminal from said terminal, switching from said second control process to said first control process and sending said transmission burst signal to said terminal;
- means for determining, from a reception burst signal received from said base station, an average value and a variance value of time dependent variations of an error of a propagation path function between said base station and said terminal, and a burst signal length of said reception burst signal, and determining a pointer to request switch from a first control process for optimizing the number of bits added per symbol depending on the probability of successful reception of a successful reception indication signal to a second control process for divisionally sending the transmission burst signal, based on the average value, the variance value, and the burst signal length which are thus determined;
- means for, if said terminal detects an data error of said reception burst signal and detects that said pointer has become larger than a predetermined first value, sending a first request to switch from said first control process to said second control process, to said base station;
- means for, if said terminal detects no data error of said reception burst signal and detects that said pointer has become smaller than a predetermined second value, sending a second request to switch from said second control process to said first control process, to said base station;

means for, if said terminal receives a request corresponding to said first request made by said base station from said base station and also detects that the burst signal length of a transmission burst signal has become larger than a predetermined third value, switching from said first control process to said second control process and sending said transmission burst signal to said base station;

means for, if said terminal receives a request corresponding to said second request made by said base station from said base station, switching from said second control process to said first control process and sending said transmission burst signal to said base station; and means for switching between a first control process for optimizing the number of bits added per symbol depending on the probability of successful reception of a successful reception indication signal and a second control process for divisionally sending a burst signal, depending on the state of a propagation path between said base station and terminals.

* * * * *